June 10, 1930.　　　F. E. LUDINGTON　　　1,762,829
MACHINE FOR PRODUCING LINED POUCHES
Filed Oct. 20, 1927　　13 Sheets-Sheet 1

Fig. 1.

INVENTOR.
Frank E. Ludington
BY

ATTORNEYS.
Chamberlain & Newman

INVENTOR.
Frank E. Ludington
BY
ATTORNEYS.

June 10, 1930. F. E. LUDINGTON 1,762,829
MACHINE FOR PRODUCING LINED POUCHES
Filed Oct. 20, 1927 13 Sheets-Sheet 5
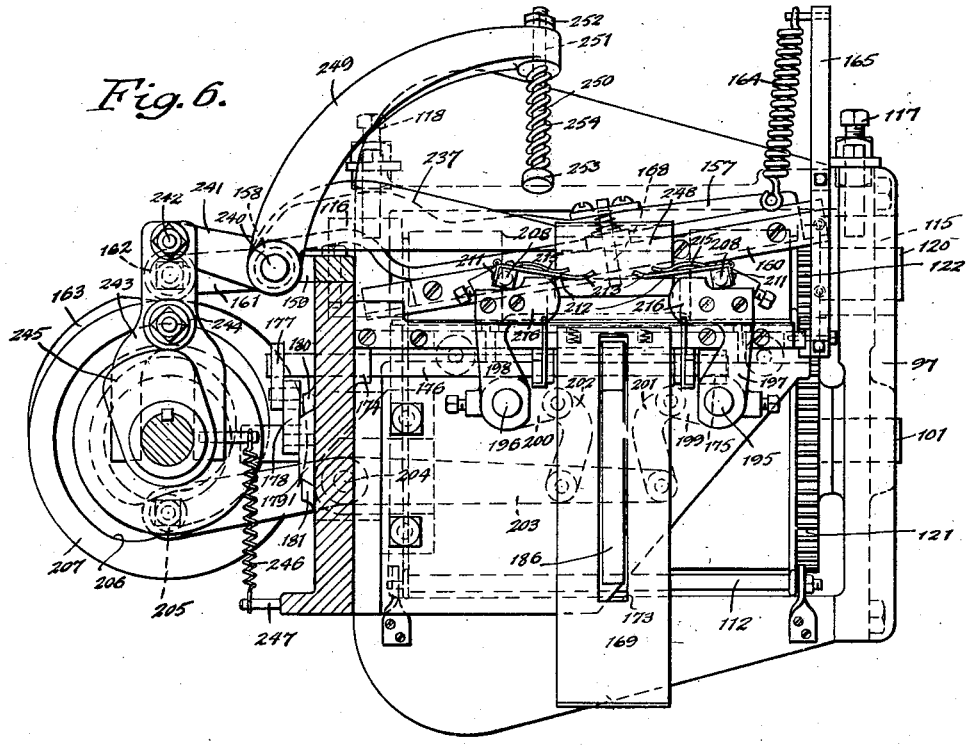
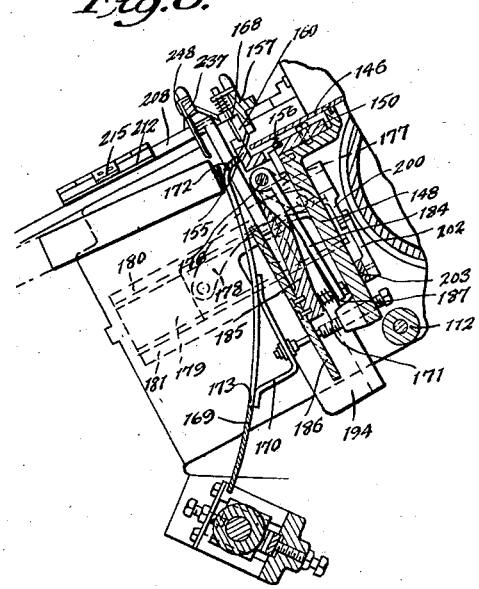
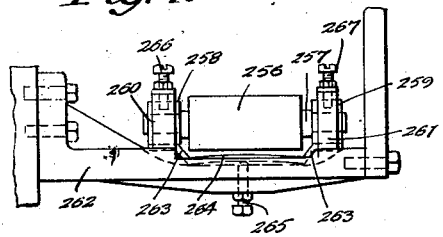
INVENTOR.
*Frank E. Ludington.*
BY
ATTORNEYS.

June 10, 1930.  F. E. LUDINGTON  1,762,829
MACHINE FOR PRODUCING LINED POUCHES
Filed Oct. 20, 1927   13 Sheets-Sheet 6
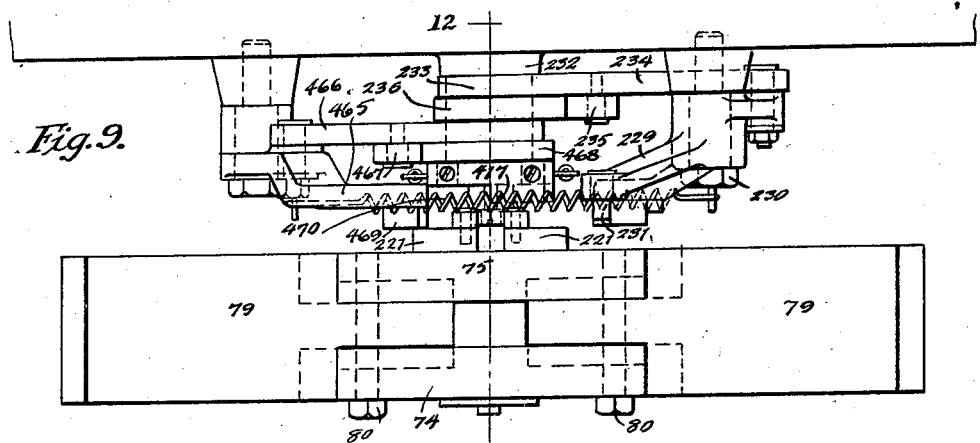
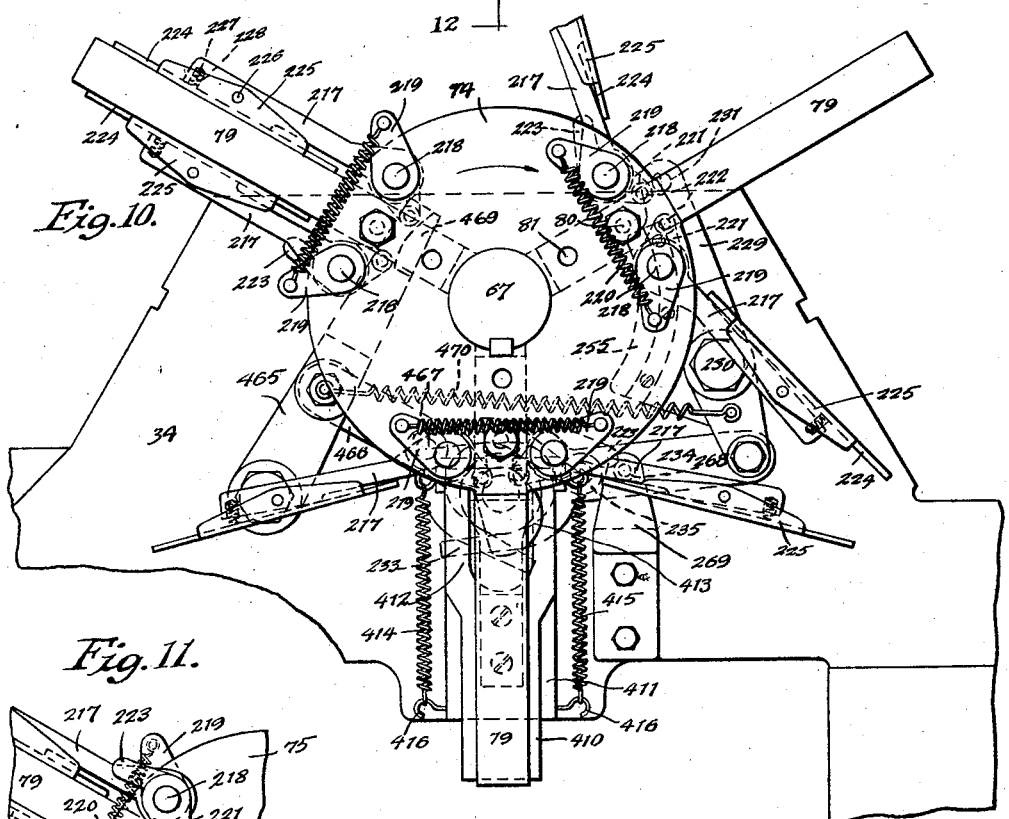
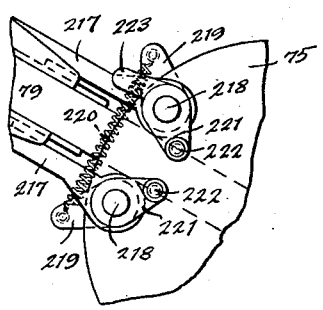
INVENTOR
Frank E. Ludington.
BY
ATTORNEYS
Chamberlain & Newman June 10, 1930.  F. E. LUDINGTON  1,762,829
MACHINE FOR PRODUCING LINED POUCHES
Filed Oct. 20, 1927   13 Sheets-Sheet 7

INVENTOR
Frank E. Ludington
BY
ATTORNEYS
Chamberlain & Newman

Fig. 13.

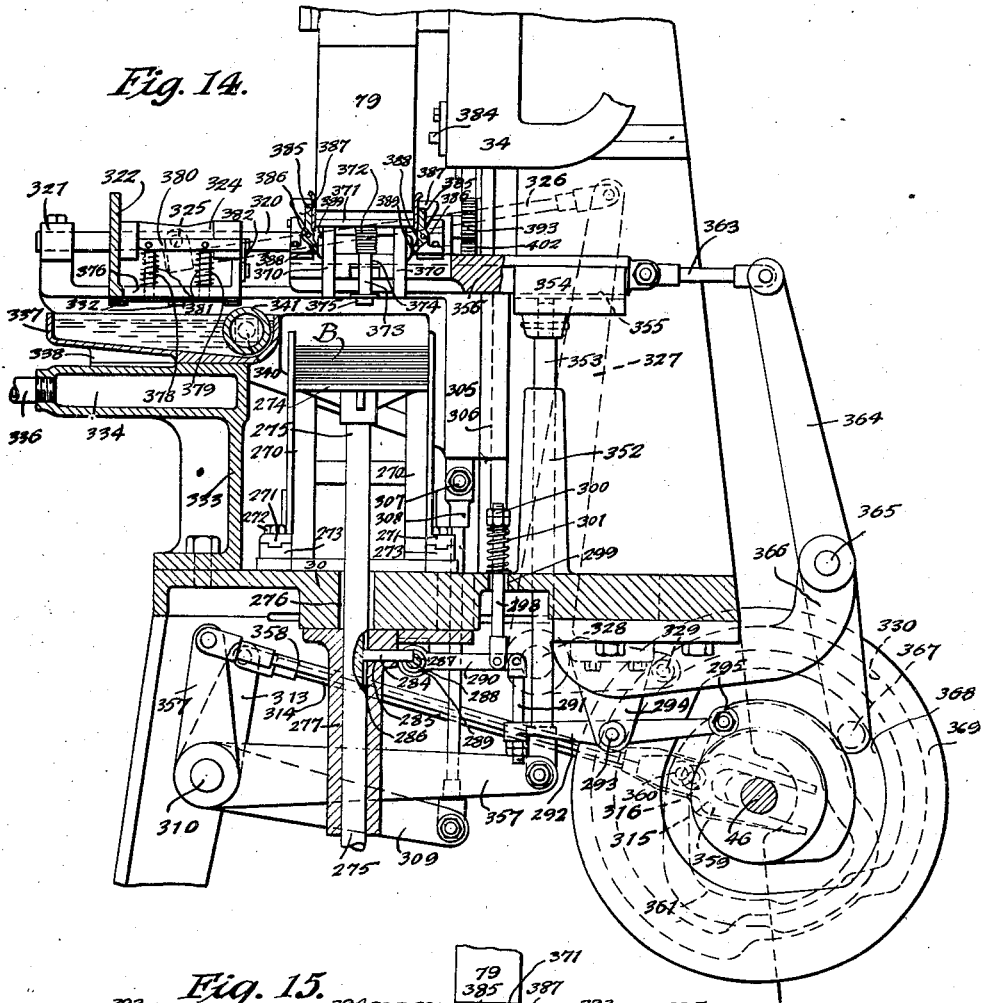
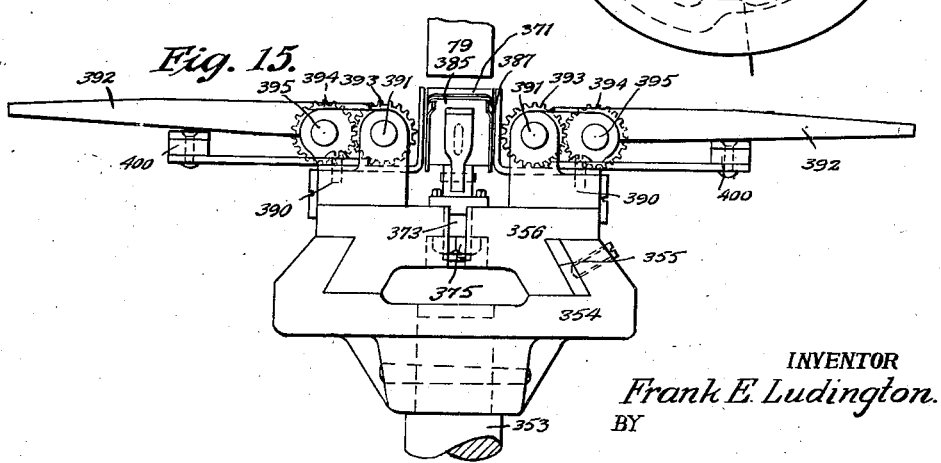

June 10, 1930.  F. E. LUDINGTON  1,762,829
MACHINE FOR PRODUCING LINED POUCHES
Filed Oct. 20, 1927   13 Sheets-Sheet 10

INVENTOR.
Frank E Ludington.
BY
ATTORNEYS.
Chamberlain & Newman

June 10, 1930.　　F. E. LUDINGTON　　1,762,829
MACHINE FOR PRODUCING LINED POUCHES
Filed Oct. 20, 1927　　13 Sheets-Sheet 11
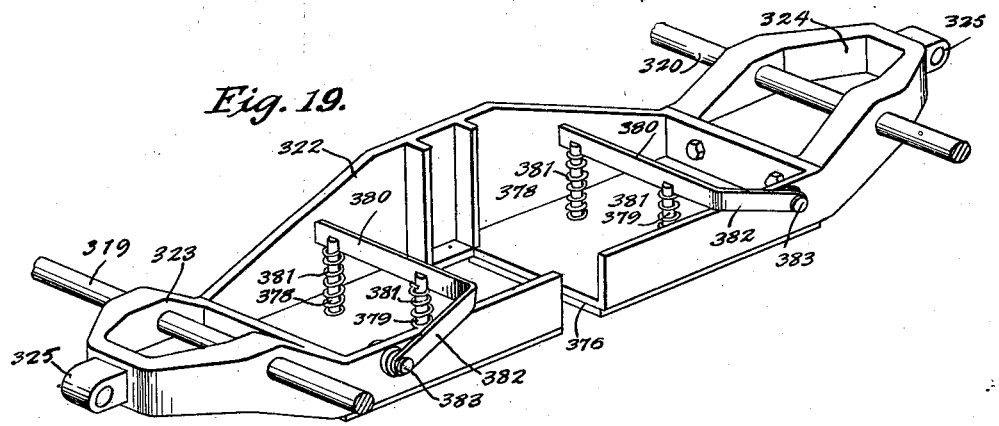
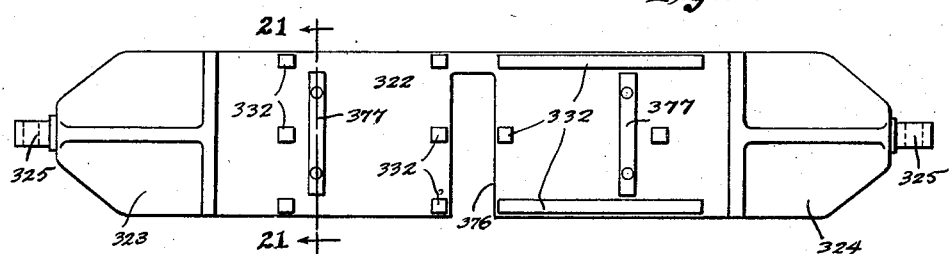
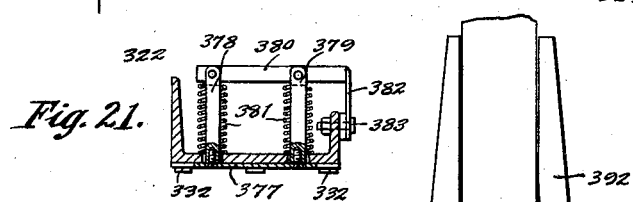
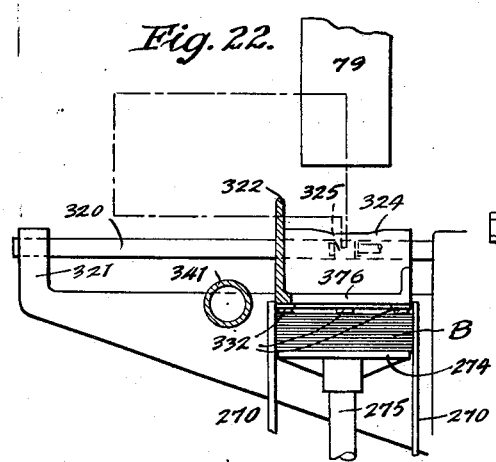
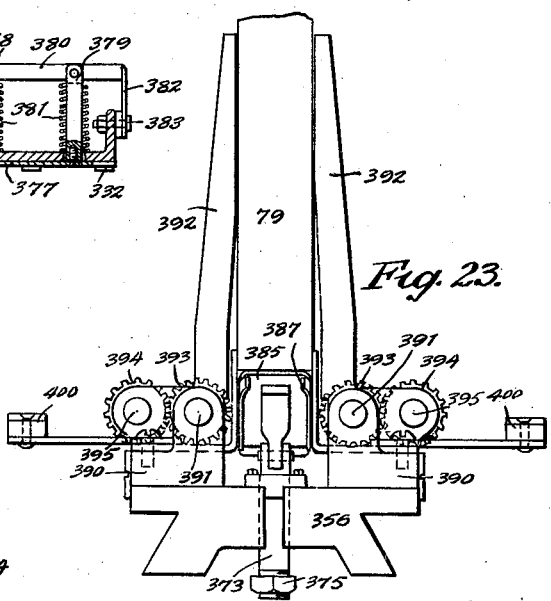
INVENTOR
Frank E. Ludington
BY
Chamberlain + Newman
ATTORNEYS

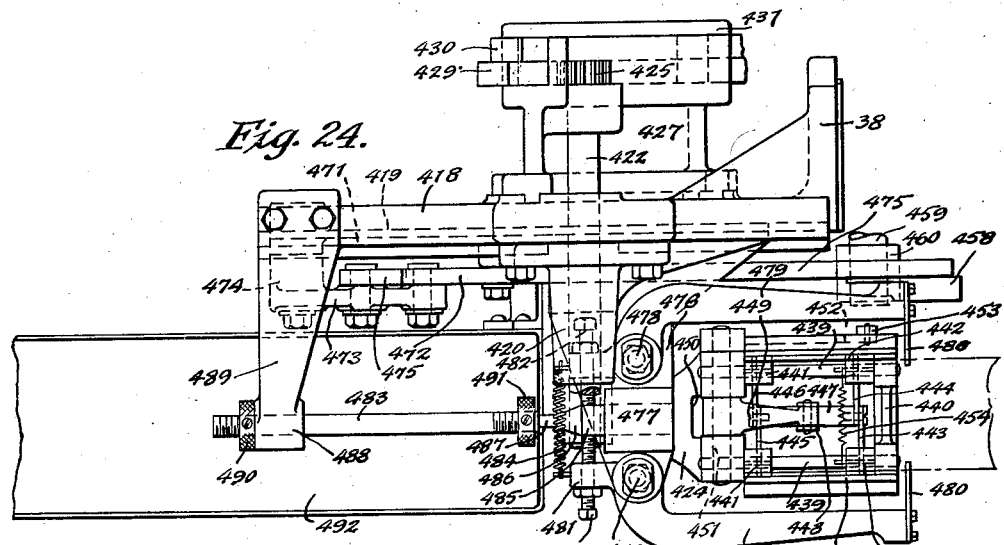
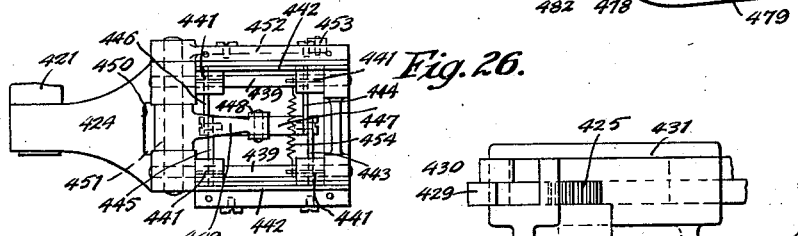
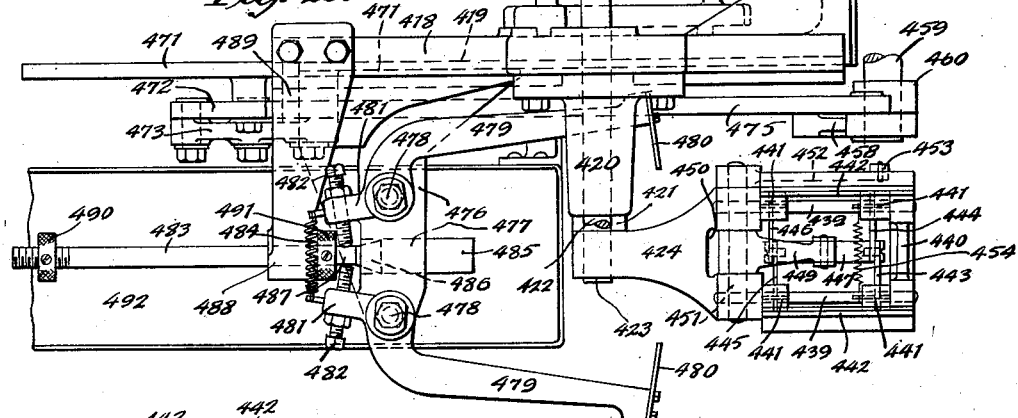
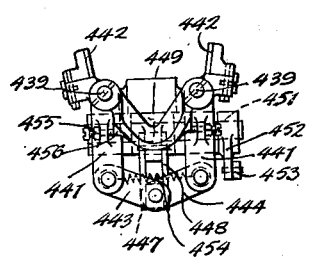

June 10, 1930.   F. E. LUDINGTON   1,762,829
MACHINE FOR PRODUCING LINED POUCHES
Filed Oct. 20, 1927   13 Sheets-Sheet 13
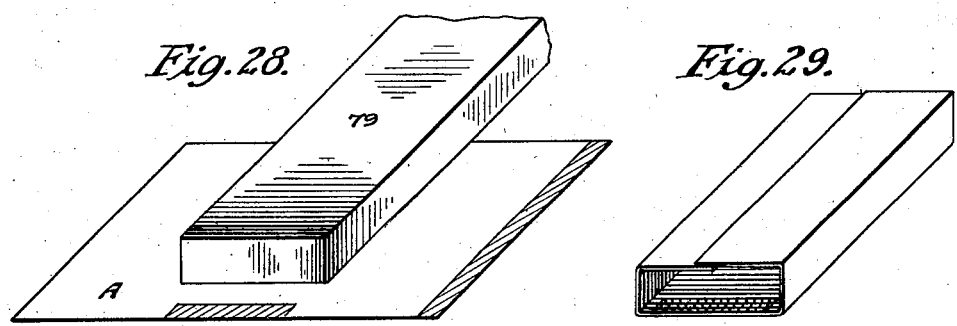
Fig.28.   Fig.29.
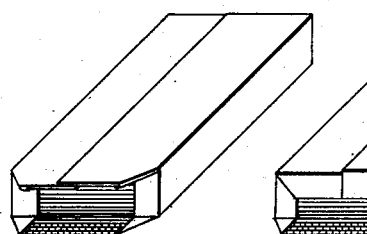 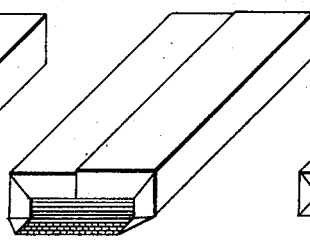 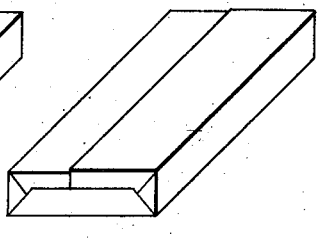
Fig.30.   Fig.31.   Fig.32.
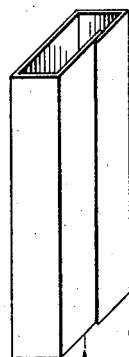 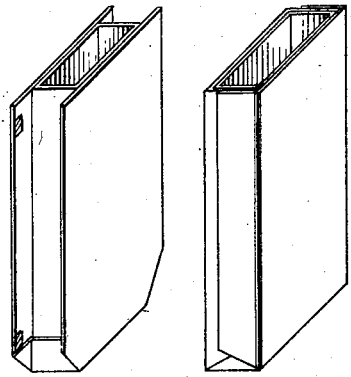
Fig.33.   Fig.34.   Fig.35.
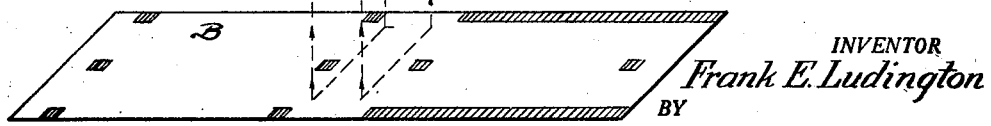
INVENTOR
Frank E. Ludington
BY
ATTORNEYS.
Chamberlain & Newman Patented June 10, 1930

1,762,829

UNITED STATES PATENT OFFICE

FRANK E. LUDINGTON, OF WATERBURY, CONNECTICUT

MACHINE FOR PRODUCING LINED POUCHES

Application filed October 20, 1927. Serial No. 227,398.

This invention relates to a machine for producing lined pouches such as are used for containing tobacco or the like, and constitutes an improvement over the machine disclosed in the U. S. patent to J. E. Fefel, #1,613,748, dated January 11, 1927.

The machine according to this invention produces lined paper pouches, the lining being in the nature of a water-proof protective element, the paper for this water-proof element being fed and folded and pasted to produce a pouch form, whereupon a paper wrapper is folded and pasted into pouch form about the lining, these operations being carried on continuously and automatically.

In particular it is proposed to provide a machine of this character in which a form carrier is intermittently rotated between a series of work stations at which feeding and forming mechanisms are respectively operated to successively produce the lining and wrapper portions of the pouch, the carrier functioning to support the forms or mandrels about which the pouches are formed, and to carry the same from one station to the next, while the feeding and forming mechanisms are substantially fixed; and it is an object of the present improvement to provide means by which the several operations may be more efficiently carried out and by which an improved product may be produced.

The machine is such that the pouch material, i. e., the lining and wrapper or label paper, is placed therein in suitable quantities—the former in the present embodiment being in the form of a continuously rolled strip, while the latter are cut into individual lengths and suitably printed and stacked in the machine.

The pouch adapted to be produced by the machine is provided with sealed folds so placed to provide a substantially hermetically sealed container and in which the folds of the lining and wrapper are not superimposed. The pouch as produced by the present embodiment of the invention has a lining in which the folds are at the bottom and along the center of one vertical face, while the folds of the wrapper are along the vertical sides, and it is proposed in the present machine to provide means whereby the folding and sealing of the pouch is more uniformly and efficiently carried out than in the machine as disclosed in my prior patent.

With the above and other objects in view, an embodiment of the invention is shown in the accompanying drawings, and this embodiment will be hereinafter more fully described with reference thereto and the invention will be finally pointed out in the claims.

In the drawings:

Fig. 1 is a front elevation of the machine, according to the present embodiment of the invention.

Fig. 6 is an enlarged sectional elevation taken along the line 6—6 of Fig. 4.

Fig. 7 is a detail plan view of a portion of the folding mechanism, i. e. the bottom portion of the part of the machine shown in Fig. 5.

Fig. 8 is a sectional elevation of certain parts, particularly the folding means, as shown in Fig. 5, but in their position during indexing of the form carrier.

Fig. 9 is an enlarged top plan view of the rotatable head or carrier, carrying the several forms or mandrels, and including the operating mechanism therefor.

Fig. 10 is a front elevation of the same.

Fig. 11 is a rear elevation of a portion of the head, and showing the spring actuated toggle means for operating the folding devices carried thereby.

Fig. 13 is an enlarged vertical sectional view through the central portion of the lower part of the machine, showing the mechanism for supporting the wrapper or label sheets for forming the pouch, and also showing the feeding, paste-applying, and folding mechanisms employed in connection therewith.

Fig. 14 is a similar view, with portions broken away, and showing the parts in a different operative position.

Fig. 15 is an enlarged detail front elevation of the folding mechanism for preliminarily folding the wrapper about the lining, the same shown in inoperative position.

Fig. 19 is a perspective view of the wrapper-feeding and paste-applying head or carrier.

Fig. 20 is a bottom plan view of the same.

Fig. 21 is a sectional view taken along the line 21—21 of Fig. 20.

Fig. 22 is a diagrammatic view showing the path of movement of the wrapper-feeding and paste-applying head.

Fig. 23 is an elevational view of the folding mechanism, as shown in Fig. 17, and showing the end-folding means.

Fig. 24 is an enlarged top plan view, with certain parts broken away, of the upper left hand portion of the machine, showing the mechanism for completing the folding of the wrapper and stripping the completed pouch from the mandrel or form, the stripping means being shown in position to remove the pouch.

Fig. 25 is a similar view and showing the inoperative position of the stripping means after removal of the pouch.

Fig. 26 is a top plan detail view of the folding device for completing the folding of the wrapper.

Fig. 27 is an end view of the folding means as shown in Fig. 25.

Figs. 28 to 32 are perspective views showing the pouch lining-paper element in its several stages of being folded into pouch form; and Figs. 33 to 35 are perspective views showing the wrapper or label-sheet element in its several stages of being folded into pouch form about the formed pouch lining, Fig. 34 showing the completed lined pouch.

Similar reference characters indicate corresponding parts throughout the several figures of the drawings.

Figure 2:
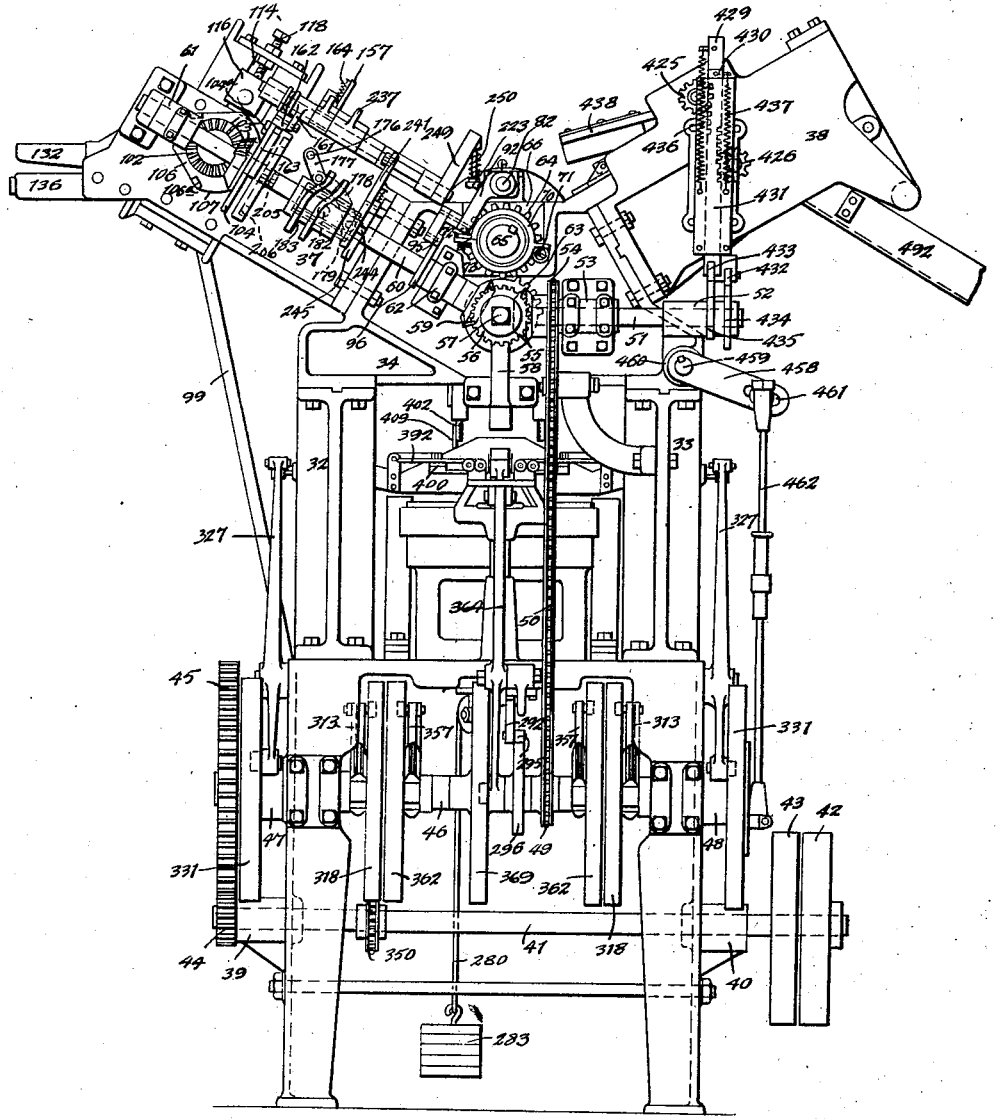
Fig. 2 is a rear elevation of the same.

Referring to the drawings, the machine according to the present embodiment of the invention is mounted upon a table-like base consisting of a rectangular top 30 having angular shaped legs 31 at its four corners and to the upper side of which are bolted vertical supports or standards 32, 33, on the upper ends of which is supported a super-structure 34 provided on each side with inclined sides 35, 36, upon which are bolted angularly disposed supporting frames 37, 38. The frame 37 is adapted to support the lining paper feeding and the forming mechanism, while the frame 38 is adapted to support the folding mechanism for imparting the final folds to the completed pouch and the stripping mechanism for removing the pouch from the forms of the carrier, the carrier being rotatably mounted upon the super-structure 34, as will hereinafter more fully appear. Intermediate the frames 37, 38 and mounted upon the base 30 there is provided a mechanism for feeding and forming the wrapper, so that three equally spaced stations are provided between which the radially disposed forms of the carrier are successively moved.

In suitable bearings 39, 40 of the base there is journaled a main drive shaft 41 provided at one end with tight and loose pulleys 42, 43 adapted for engagement by a driving belt (not shown), and provided at its other end with a pinion 44 which meshes with a large gear 45 upon the end of a cam-carrying countershaft 46, journaled in suitable bearings 47, 48 of the base. A sprocket gear 49 secured upon the shaft 46 intermediate its ends, which drives through an endless sprocket chain 50 a shaft 51 journaled in bearings 52, 53 of the super-structure 34, such shaft having a sprocket gear 54 secured thereon and over which said sprocket chain 50 is engaged.

A bevelled pinion 55 is provided upon the inner end of the shaft 51 which meshes with and drives a bevelled pinion 56 carried upon a stud shaft 57 journaled in a bearing bracket 58 secured to the super-structure 34, and which in turn meshes with a bevelled pinion 59 provided upon the end of an inclined drive shaft 60 journaled in bearings 61, 62 secured upon the frame 37, and super-structure 34 respectively, and extending along an inclined axis longitudinally of the inclined frame 37.

Figure 12:
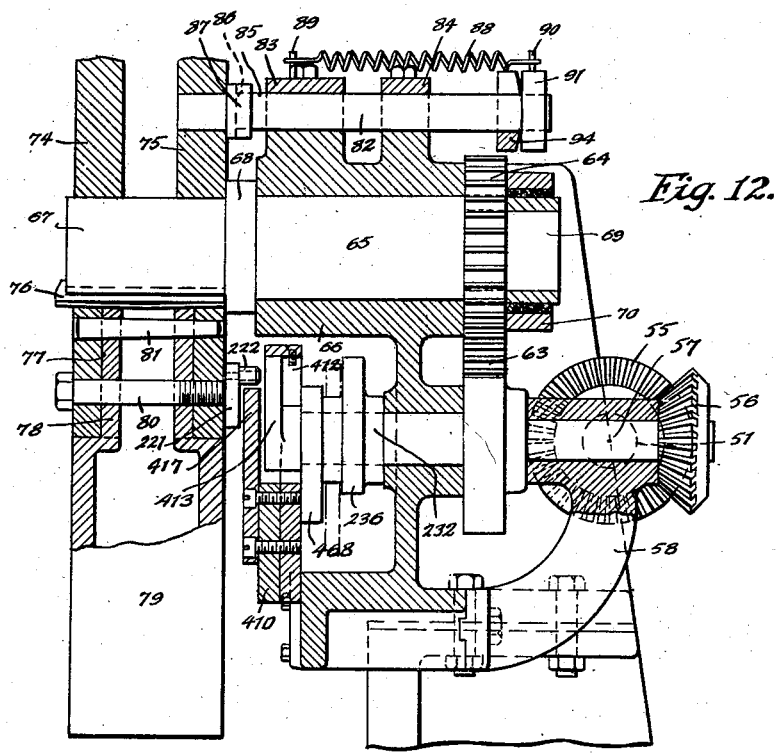
Fig. 12 is a central vertical sectional view taken along the line 12—12 of Fig. 9.

The stud shaft 57 carries a segmental spur gear 63 adapted to intermittently mesh and partially rotate a spur gear 64 upon the end of the form carrier shaft 65 rotatably mounted in the bearing portion 66 of the super-structure (Fig. 12). The forward end of the shaft 65 is reduced, as at 67, and at the inner end of said reduced portion there is provided a bearing shoulder 68. At the other end of the shaft 65 there is provided a reduced extension 69 about which there is disposed a brake band 70 secured to the frame by means of a bolt 71 with a split flanged portion 72 engaged by an adjustment screw 73 and by means of which the brake band may be adjusted with respect to the shaft 65. This brake band is adapted to exert friction on the shaft 65 so that as the same is intermittently rotated by the gear 63 it will stop immediately after each movement. The carrier comprises a pair of discs 74, 75 splined to the shaft by means of a spring retained key 76. An arm 76ª, Fig. 1, secured to the frame 34 retains the carrier against axial movement upon the shaft 65. At three equally spaced points the plates are provided interiorly with radial grooves 77 in which are engaged the shanks 78 of the forms 79, the shanks being clamped and secured between the discs within said grooves by means of clamping bolts 80 and tapered pins 81. These radially disposed forms are of rectangular shape and of such dimensions as to constitute forms about which the pouches are folded—in other words, the exterior dimensions of the forms correspond to the desired capacity of the pouches, and as is clear from Fig. 12, they are of a hollow construction to obtain lightness.

The shaft 51 and the stud shaft 57 are continuously rotated throughout the operation of the machine and the continuously rotated segmental gear 63 carried by the stud shaft is so dimensioned that it rotates the form carrier shaft 65 through 120° during each complete revolution of the shaft 51, whereby the forms 76 are intermittently moved from one station to the next.

In order to lock the positions of the form carrier, a sliding bolt 82 is mounted in guide bearings 83, 84 formed upon the upper side of the bearing 66, and is provided at its inner end with a tapered tooth portion 85 adapted to engage the recess 86 provided in each of a series of three locking blocks 87 secured in the disc 75 at spaced points corresponding to the spacing of the forms 79. The bolt 82 is normally held in engaged position with the block 87 by means of a spring 88 tied between a pin 89 secured upon the bearing portion 83 and a pin 90 provided upon a collar 91 secured upon the outer end of the bolt. The bolt is adapted to be intermittently retracted during the movement of the form carrier, and for this purpose a lock lever 92 is rotatably mounted upon the super-structure 34 at 93, and is provided with a forked end 94 embracing the bolt 82 and engaging the collar 91 thereon, and upon the other end of the lever 92 there is provided a roller 95, which rides upon a cam 96 secured upon the cam shaft 60, the spring 88 adapted to yieldably retain the roller in engagement with the cam. It is understood that the cam is so designed that the lever 92 is rocked in one direction during the periods of rotation of the form carrier to thereby withdraw the bolt 82 from engagement with the blocks 87, and at the end of each of these periods is rocked in the other direction to permit the bolt to enter the recess 86 of the blocks under the action of the spring 88.

The inclined frame 37 is provided at its outer end with a transversely disposed supporting structure including a vertically disposed wall 97 spaced from the frame and integrally formed horizontally disposed angular beams 98 extending between the upper and lower ends of the frame 37 and the four corners of the wall 97, the outer end of the transverse super-structure being supported by a strut 99 secured at its lower end to the base 30 and at its upper end to the under side of the structure.

Within the transverse supporting structure there is provided a paper feed drum 100 having a shaft 101 journaled at one end in the vertical wall 97 and at its other end in the frame 37, and upon the end of said shaft there is provided a bevelled gear 102 adapted to be intermittently engaged and partially rotated by means of a segmental gear 103 secured upon the shaft 60, the relation of the gear 103 to the gear 101 being such that during a complete revolution of the shaft 60 the gear 103 and the said drum 100 are rotated one third of a revolution to feed a length of the lining-forming paper, as will presently more fully appear.

Figure 3:
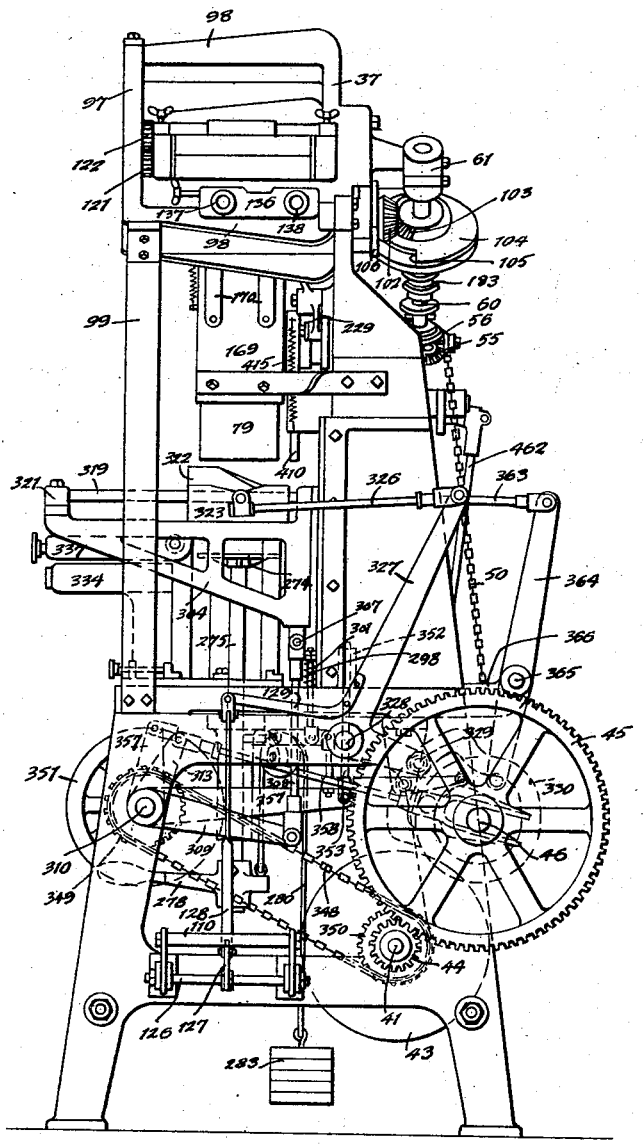
Fig. 3 is a side elevation as seen from the right, Fig. 1.

Between these feeding periods the position of the drum is adapted to be fixed, and for this purpose the shaft 60 is provided with a disc 104 having a segmental cut-out portion 105 (Figs. 3 and 4) in radially aligned relation with the teeth of the gear 103 and which cooperates with a plate 106 carried by the shaft 101 of the drum. The disc 104 and the plate 106 together with the gears 102 and 103 cooperate in the nature of a Geneva stop movement, the plate 106 having three flat faces, and truncated apices 107 (Fig. 2), which faces engage the flat marginal faces of the disc 104 in successive relation during the stationary periods to fix the position of the drum, the apices 107 moving through the cut-out 105 of the disc during the meshing or rotational periods of the gear 103 with the gear 102. Upon the face of the disc 104 adjacent one end of the cut-out 105 there is provided a block or dog 104ª, and upon the plate 106 there are provided adjacent one end of each of the apices 107 blocks or dogs 106ª. These blocks are adapted to engage the gear 103 at the beginning of each rotational movement of the drum, and serve to start the motion and take pressure off the first gear tooth of the gear 103, thus eliminating to a great extent the wear on the first tooth of said gear 103.

The paper A for forming the pouch lining is in the form of a continuous rolled strip, the paper roll having its spooled ends 108 supported in a suitable rack 109, the strip of paper being carried along a tensioning roller 110 mounted upon an arm 111, pivotally supported upon the base, and then carried over a roller 112 mounted upon the frame 37, and from which latter roller it is carried about the drum 100.

The vertical wall 97 and the opposed vertical wall of the frame 37 are provided with vertical slots 113, 114 in which bearing blocks 115, 116 are mounted for vertical adjustment by means of pressure screws 117, 118, a feed roll 119 being mounted between said blocks, and having its shaft 120 journaled therein and adapted to be driven from the shaft 101 of the drum 100 by means of a large gear 121 provided on said shaft 101 adjacent the inner side of the wall 97, and a pinion 122 meshing therewith and secured upon the shaft 120.

The roll 119 bears upon the drum 100 and may engage with greater or less force, as desired, by tightening or loosening the pressure screws 117, 118, the paper A being carried between the drum and the roll and thereby fed into the machine.

In order to maintain a uniform and straight feed of the paper, there is provided at the under side of the drum 100 a spring arm 123 secured as at 124 to the under side of the frame, and provided with frictional contact ends 125 which yieldably press the paper against the drum so that there is no chance of any slack occurring in the paper as it passes around the drum. In order to assist in the feed of the paper A, the arm 111 carrying the roller 110 is intermittently oscillated, and for this purpose, the shaft 126 upon which the arm 111 is mounted, is provided with a short arm 127 connected by a link 128 to an arm 129, which latter is secured to an oscillating part of the machine hereinafter more fully described, and as clearly indicated in Figs. 1 and 3. In this manner the lever 111 is intermittently oscillated and imparts a pulling impulse from the paper to the roll, thereby relieving the feed by the drum 100 and the roll 119 from the weight of the paper roll.

Figure 5:
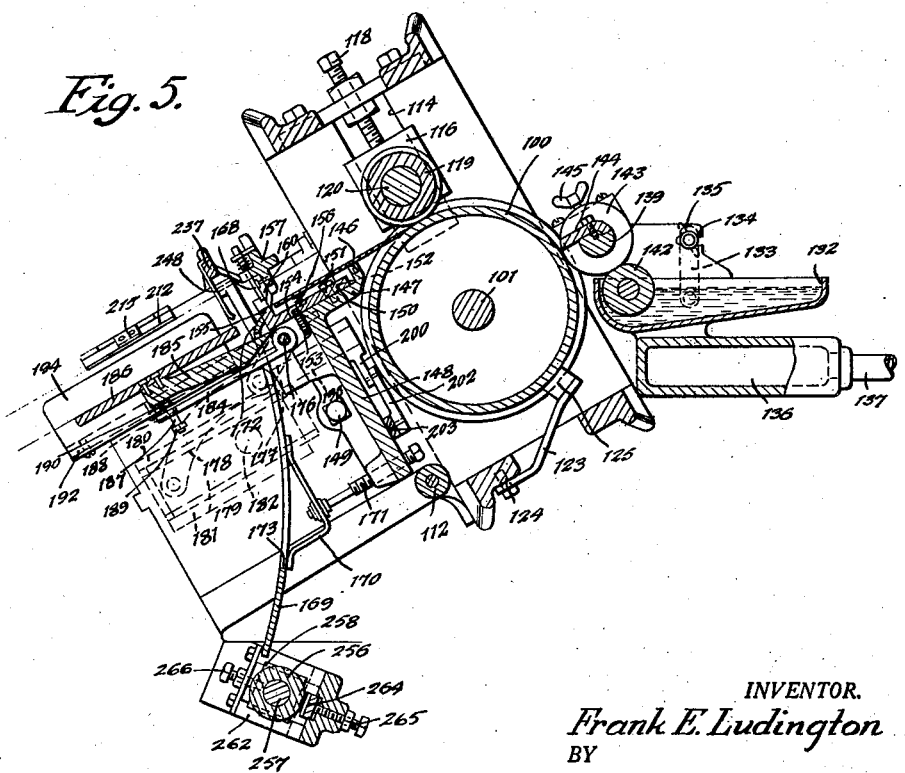
Fig. 5 is a sectional elevation taken along the line 5—5 of Fig. 4.

As the paper is fed about the drum 100, and prior to its severance by the cutting mechanism, hereinafter more fully described, it is adapted to be gummed along one longitudinal edge and along a portion of its transverse edge, as indicated in Fig. 28. The pasting mechanism for this purpose is mounted upon suitable bracket extensions 130, 131 of the frame 37 and the vertical wall 97, and consists of a paste reservoir 132 removably secured between said brackets by means of hangers 133, (Fig. 5), said hangers being secured in the brackets in open-ended slots 134 by means of winged nuts 135 for removal of the reservoir for cleaning purposes when desired. Beneath the reservoir there is provided between the brackets 130, 131, a hollow heating chamber 136, provided with inlet and outlet pipes 137, 138 for the admission of steam or other suitable heating medium to maintain the paste within the reservoir in a liquid condition. The paste supplying means is mounted upon a shaft 139 journaled at its ends in the brackets 130, 131, and provided at one end with a gear 140 meshing with the gear 121 of the drum 100, the gear 140 in turn meshing with a pinion 141 provided upon the shaft end of a pasting roller 142, partially submerged in the paste in the reservoir and adapted to feed the paste to the paste applying means. These means it will be understood may be of any suitable construction to apply paste upon the paper at the desired points. In the present embodiment they consist of a roller 143 mounted upon one end of the shaft 139 and a tangentially extending plate 144 secured to the shaft having its end coincident with the peripheral surface of the roller 143, and adapted with said periphery to engage with the paste feeding roller 142 and carry the paste therefrom to the surface of the paper being fed about the drum 100.

The shaft 139 is removably secured in its bearings by winged nuts 145 to permit of its being conveniently taken out of the machine for the purpose of cleaning.

As the lining paper is fed between the drum 100 and the roller 119, it moves onto a downwardly inclined table 146 mounted upon the upper recessed end 147 of a bracket member 148 secured by bolts 149 to the inner side of the form member 37, the upper surface of the table 146 being substantially in line with the underside of one of the radially disposed forms of the form carrier. Within the recess of the portion 147 of the bracket 148 there is disposed a plate 150 adjustably secured beneath the upwardly projecting table 146 by means of bolts 151 engaged in longitudinal slots 152, said plate being adjustable by means of knurled set screws 153 secured into the forward face of the bracket 148 and engaged at their peripheries in transversely disposed slots 154 provided in the plate 150. At the forward end of the plate 150 there is provided an upwardly extending flange 155 constituting an anvil for cooperating with the cutting knife, presently to be more fully described, the cutting edge of this anvil portion being substantially flush with the upper surface of the table 146. During the cutting operation the table 146 is adapted to be depressed and thereupon resumes its flush relation with the anvil in order to bring the paper to the proper level for feeding into the machine, and for this purpose the forward portion of the table is flexible, and coil springs 156 are disposed between its under side and the plate 150, so that the table resumes its normal flush relation as pressure is lifted therefrom.

The cutting mechanism comprises an arm 157 pivotally mounted at 158 in a bracket 159 secured at the rearward side of the frame 37, and provided with an elongated cutting blade 160 adapted upon depression of the arm to cooperate with the anvil 155 with a scissor-like cutting action. The arm 157 is further provided with a rearwardly extending crank or lever arm 161 having a roller 162 at its end which rides upon a cam 163 secured upon the cam shaft 60 and held in yieldable engagement therewith by means of a spring 164 tied between the forward end of the arm 157 and an upright post 165. The cutting knife is adapted to be operated once during each revolution of the cam shaft 60 to sever a length of paper to form a pouch lining. The arm 157 is adjustable with relation to the lever 161, and for this purpose the arm 157 is provided with a split hub 166 adapted to be clamped in adjusted relation by means of a bolt 167. It will be understood that the lining paper has been fed forwardly in relation to one of the forms of the form carrier where it is held by means presently to be described, and in order to retain the cut edge prior to the folding operation, there is provided upon the arm 157 a spring pressed plunger 168 adapted as the cutting blade severs the paper to press the same against the upper surface of the anvil 155, and thereby retain the edge of the paper until its side portions are folded upwardly.

A curved guide member 169 is supported forwardly of the anvil 155 by means of a bracket 170 connected to the lower end of the bracket 148 by means of a threaded adjustable rod 171 adapted to permit of the inward and outward adjustment of said guide member, the upper end of the guide member having a rounded corner 172 disposed just below the edge of the anvil member, and the guide member extending downwardly therefrom in concentric relation to the rotatable form carrier. A slot 173 is provided in the guide member through which the means for supporting the lining paper against the under side of the forms, during the initial folding operations, is adapted to be operated.

As the paper is fed inwardly over the table 146 and the anvil 155, it moves beneath the form, and is thereupon adapted to be folded about same by a mechanism now to be described. Within suitable bearings 174, 175 of the bracket 137, there is rotatably mounted a shaft 176, one end of which is extended through the frame 37 and is provided with a crank arm 177 connected by a link 178 to a slide member 179 slidable in guide ways 180, 181 and provided with a projecting roller 182 engaging the groove of a barrel cam 183 secured upon the cam shaft 60 and adapted to reciprocate the slide to impart intermittent rocking movement to the shaft 176. Upon the intermediate portion of the shaft 176 there is secured an arm 184 adapted to move through the slot 173 of the guide 169, and above this arm 184 there is pivotally mounted upon the shaft 176 an arm 185 provided with a plate 186, and having a post 187 extended through a slot 188 provided in the arm 184, the post being provided at its end with a stop nut 189 and being provided between the arm 184 and the arm 185 with a coil spring 190 adapted to normally space the two arms from each other and to permit relative movement of them toward each other upon compression of the spring. There are also secured upon the shaft 176 a pair of arms 191, 192 projecting at each side of the guide 169 and provided with vertically disposed folding plates 193, 194 so spaced as to engage at each side of the form during the operations of the folding mechanism to fold the sides of the lining paper upwardly about the form. In the operation of this mechanism the same moves from the position shown in Fig. 8 into relation with the form beneath which the lining paper has been fed, the plate 186 engaging the paper and holding it against the form, whereupon its movement is stopped by the form and a further movement of the shaft 176 moves the folding plates 193, 194 to the position shown in Fig. 5, thereby folding the sides of the lining paper upwardly about the form.

The portions of the paper extending above the upper surface of the form are now adapted to be folded inwardly, and by the same operation the ends of the side portions of the wrapper are adapted to be folded inwardly upon the end of the form, as indicated in Fig. 30. For this purpose there are provided in suitable bearing bosses of the bracket 148, a pair of rocker shafts 195, 196, upon the inner ends of which there are respectively secured folding arms 197, 198, and provided upon their outer ends with rocker arms 199, 200 projected inwardly toward each other and connected by links 201, 202 to a lever arm 203 pivotally mounted at 204 in the frame, and provided at its end with a roller 205 engaging a cam groove 206 provided in the face of a cam 207 secured upon the cam shaft 60.

Figure 4:
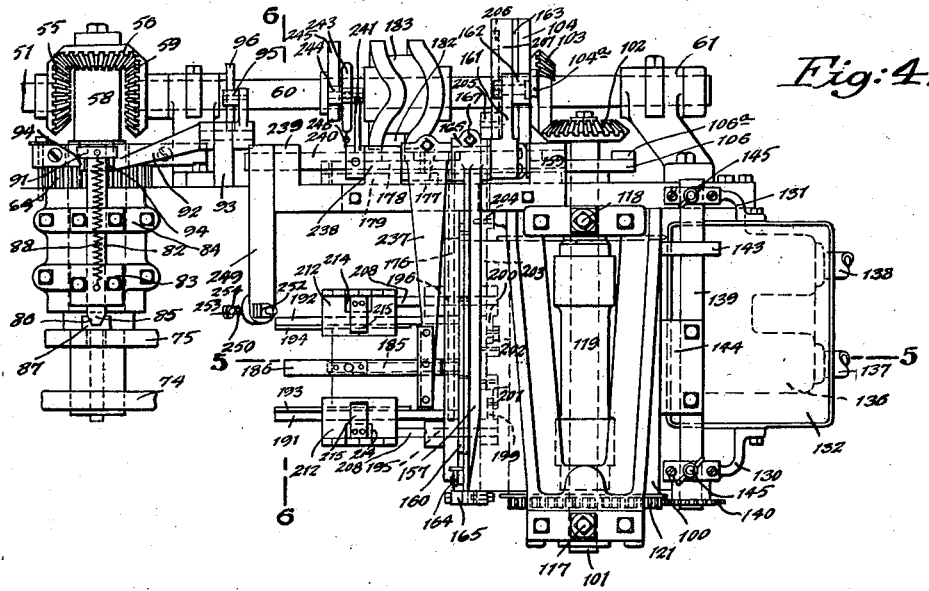
Fig. 4 is an enlarged plan view of the upper right hand portion of the machine, showing the lining-paper-feeding, paste-applying, cutting, and folding mechanisms.

Upon the upper end of each arm 197, 198 there is provided a bar 208 of rectangular cross section having a cylindrical shank 209 at one end secured in a corresponding opening of the arm, and adjustably secured in said opening by means of a set screw 210. Upon the outer side of this bar 208 there is secured a hinge plate 211, to which is hinged an inwardly projecting plate 212, having its inner end slightly grooved, as at 213, and being provided adjacent its hinge with a rectangular cut-out portion 214, as indicated in Fig. 4, and within which portion there is secured to the bar 208 a leaf spring 215 projected inwardly and bearing downwardly upon the upper surface of the plate 212, so that upward yielding movement of said plate is permitted.

As the arms 197, 198 are rotated inwardly the plates 212 engage the upwardly folded side portions of the lining paper and fold the same downwardly on the upper side of the frame, their action being such as to move inwardly with a wiping effect, that is, with slightly yielding pressure. One of the plates 212 is fed slightly in advance of the other, so that the unpasted side of the lining paper is folded down first, thereby insuring proper superimposing of the pasted edge of the other side.

Simultaneously with the folding in of the sides of the paper, the projecting end portions of the sides are folded inwardly forming gusset folds upon the ends of the form by means of projecting folding plates 216 secured to the arms 197, 198, and having their rounded projected portions so disposed as to engage the end of the forms.

Each of the forms is provided at its upper and lower sides with means for holding the pouch elements being folded thereon at the several stations during the rotation of the carrier. The holding means for the several forms are of similar construction and each consists of arms 217 pivotally mounted upon pins 218 engaged in the discs 74 and 75 above and below the forms and projecting at their ends beyond the outer surfaces of said discs. Upon the forward projecting portions of said pins there are secured toggle lever arms 219 connected at their ends by means of a spring 220, and upon their rearwardly projecting ends said pins are provided with operating levers 221 extending in opposed directions to the levers 219, and respectively provided with roller ends 222 spaced from each other and adapted to be engaged by operating means for actuating the arms. The arm 221 disposed at the upper side of the form in its position in relation to the first or lining folding station, is further provided with a projecting finger 223 disposed substantially in line with the arm 217 and adapted, as will presently more fully appear, to cooperate with means for exerting additional pressure from the upper arm 217 at this station for the purpose of more tightly pressing together the edges of the lining. Upon the outer ends of the arms 217 there are holding plates 224 respectively provided, these plates being flanged at their sides as at 225, and pivotally mounted upon the arms by means of pins 226 engaged in the arms and said flanges of the plates, the outer ends of the plates being yieldably pressed outwardly by means of cushion springs 227 engaged in sockets 228 formed in the ends of the respective arms, and bearing upon the underside of the plate. The holding arms are adapted to be actuated by preliminary pressure being applied to the levers 221 sufficient to rotate the pins 218 to a point where the center upon the end of the lever 219, to which the spring 220 is secured, is carried over the center of the pin 218 whereupon the spring 220 will complete the movement of the arms with a relatively quick snap action. This same operation occurs in each closing or opening of the arms.

Following the folding of the lining paper about the form to the point thus far described, the upper holding arm 217 is adapted to be actuated to closed position for the purpose of retaining the folded sides of the paper in folded position, and applying pressure to the pasted edge to secure the same. The mechanism for actuating this arm to its closed position is shown in Figs. 9 to 12, and consists of a lever 229 pivotally mounted upon the super-structure 34 at 230, and provided at its upper end with a pin 231 adapted upon rotation of said lever in counter-clockwise direction, as shown in Fig. 10, to impart rotary movement to the arm 217 to such point at which the action of the spring 220 comes into play, thereby causing said arm to move to closed position upon the upper surface of the form. The shaft 57, heretofore referred to, and driven from the shaft 51, is provided at its inner end with a cam carrying collar 232 which is engaged by the forked end 233 of a link 234 pivotally connected to the lower end of the lever 229. Upon the link 234 there is provided a roller 235 which rides upon a cam 236 formed from the collar 232 and adapted to reciprocate the link 234 to and fro, thereby oscillating the lever 229, so that in proper timed relation the pin 231 at its end successively engages the pins 222 of the upper arms 217 of the several forms as they are successively positioned in relation to the lining feeding and folding mechanism, to close the upper holding means upon said form.

The next folding operation upon the lining consists in folding the projecting end of the upper pasted fold upon the outer end of the form, and for this purpose an arm 237 is pivotally mounted in brackets 238, 239, the pivotally mounted shaft 240 of said arm projecting beyond the bracket 238 and being provided with a lever 241 projected above the shaft 60 and pivotally connected at 242 to a yoke member 243, which latter embraces the shaft 60 and is provided with a roller 244 which rides upon a cam 245 secured to said shaft, the roller being constantly engaged with the cam by means of a spring 246 extending between the yoke member and a pin 247 secured in the frame. The arm 237 has secured to its inner end a folding plate 248, adapted upon downward movement of said arm to engage the forward end of the form and thereby fold down the upper portion of the lining to form the same, as shown in Fig. 31.

There is also mounted upon the shaft 240 of the arm 237 an arm 249 provided at its end with a plunger 250 slidably engaged in a passage 251 provided at one end with check nuts 252 engaged with the upper side of said arm, and provided at its other end with a head 253 between which and the underside of the arm there is provided a coil spring 254. As the arm 237 is operated, folding down the projecting ends of the upper folds of the lining, the arm 249 is also operated and brings the head 253 of the plunger 250 into engagement with the projecting finger 223 of the holding arm 217, thereby exerting additional pressure upon said arm to more securely press the pasted edges of the lining together. At this point, the carrier, which has been stationary during the several folding operations, is indexed to its next position, the pouch lining being held upon the form by means of the holding arm 217 which has been closed down upon the same, as above pointed out, and the several folding mechanisms, with the exception of the arm 237 which remains in engagement with the end of the form until the same starts to move away, having been moved to their inoperative position. During the initial indexing movement of the carrier, the plunger head 253 remains in pressing engagement with the finger 223 to a point where the roller 222 of the arm 221 engages a cam 255, concentrically arranged with respect to the axis of the form carrier and extending to a point in spaced relation to the next station.

During this movement of the form to the next station, the end of the same engages the circumferential member 169, and as the same passes over the rounded corner 172 of said member, the projecting lower flap of the pouch end, which contains paste along its edge, is folded upon the end of the form and in pasted relation with the previously folded end folds of the pouch, the pressure between the end of the form and the member 169 which continues until the form moves out of engagement with said member, pressing the folded end of the pouch, as shown in Figs. 8 and 32. In order to provide additional pressure upon this pasted end of the pouch lining, there is provided at the lower end of the member 169 a rubber pressure roller 256 having its shaft 257 journaled in bearing blocks 258, 259 slidably disposed in guide supports 260, 261 mounted upon a bracket arm 262 supported upon the frame, and engaged at their underside by the offset ends 263 of a leaf spring 264 engaged centrally by a set screw 265 adjusted to vary the pressure of said spring. The outward movement of the bearing blocks 258, 259 is limited by adjustment screws 266, 267. The mounting of the roller 256 is such that its pressure may be adjusted as desired, and also its projection with respect to the end of the guide member 169 may be accurately determined so as to insure a firm sealing of the pasted end of the pouch lining.

As the form carrying the folded pouch lining moves to its second position, at which it is vertically disposed and dependent, the holding arm 217 and its plate 224 are moved to open position by means of a stud 268 mounted on a bracket 269 secured to the super-structure 34, said stud engaging the pin 222 of the arm 221 as the form approaches said second position and moving the arm 217 to a point where the spring 220 completes its opening movement. The pouch lining is now in position to have the wrapper folded about it.

The pouch wrappers B are placed in the machine in stacked form within a vertically disposed container guide comprising vertically disposed corner pieces 270 of right angular cross section secured at their bases to horizontally disposed slides 271 adjustably secured by bolts 272 in grooved tracks or ways 273 mounted upon the table portion 30 of the base, and adapted to permit of adjustment of said corner pieces to accommodate wrappers of different sizes. Within the container guide there is provided a vertically movable table 274 mounted upon the upper end of a vertical plunger 275 extending through an opening 276 in the base and having sliding bearing in a tubular cylindrical bearing member 277 secured to the underside of the table. At the lower end of the plunger 275 there is secured a handle member 278 adapted to permit of manual raising and lowering of the table for the purpose of inserting the wrappers, and to an eyelet secured thereto is attached one end of a cable 280 extending over a pulley 281, rotatably mounted in a bracket 282 formed integrally with the attaching plate of the member 277, and to the lower end of which cable there is secured a weight 283 adapted to exert an upward force upon the plunger 275 and table 274 to normally press the wrappers upwardly in the container guide.

The table 274 and its plunger 275 are intermittently held against upward movement in the intervals between the wrapper feeding operations, hereinafter more fully described, by means of intermittently operated mechanism, comprising a gripping plug 284 slidably mounted in a passageway 285 formed in the member 277 and adapted to be engaged at one end with a key slot 286 in the plunger 275 and engaged at its other end in a right angular cut-out 287 provided in a horizontally disposed shaft 288 mounted for rocking movement in bearings 289 formed upon the inside of the attachment plate portion of the cylindrical bearing member 277. An arm 290 is secured to said shaft 288 and is pivotally connected at its end to a vertically disposed connecting rod 291 adjustably connected at its lower end to one end of a lever arm 292 pivotally mounted at 293 in a bracket 294 secured to and suspended from the under side of the table portion 30, said arm being provided at its other end with a roller 295, which rides upon a cam member 296 secured to the shaft 46 and provided at one point with a tripping projection 297. The arm 290 is pivotally connected adjacent its end with vertically disposed rods 298 extending upwardly through an opening 299 in the table portion 30 and provided between the adjustable lock nuts 300 secured to its end and the upper surface of said table with a coil spring 301 exerting an upward pressure upon said rod which in turn is adapted to rock the arm 290 so that the vertical face of the right angular recess 287 of the shaft 288 is pressed inwardly against the plug 284 to grippingly engage it within the key slot of the plunger 275, said spring also serving to maintain the roller 295 in engagement with the surface of the cam 296. Upon each rotation of the shaft 46 the projection 297 rocks the lever 292, imparting a slight rotation to the arm 290 in a clockwise direction, which moves the vertical face of the recess 287 out of engagement with the end of the gripping plug, thereby releasing it to permit the table 274 to move upwardly under the lifting force of the weight 283. Simultaneously with this lifting movement feeding mechanism, presently to be described, is actuated for removing the uppermost of the wrappers from the stack to a position relative to the form 279 carrying the folded pouch lining.

Upon the standards 32, 33 of the main supporting frame of the machine there are respectively provided vertical brackets or slideways 302, 303, within which there are mounted for vertical reciprocation the rearwardly projecting ends of forwardly projecting bracket members 304, 305, the flanged rearward bases of said members being retained within said slideways by means of gib plates 306. These brackets are adapted to be vertically reciprocated for the purpose of removing the wrapper feeding mechanism into and out of relation with the stack of wrappers and the pouch carrying form; and also into and out of relation with the paste mechanism for applying paste to the wrappers. These members 304, 305 are preferably formed of aluminum or other relatively light material and to the lower end of the base of each of them there is pivotally connected the forked end 307 of a link 308, connected at its other end to a bell crank lever 309 loosely mounted upon a shaft 310 journaled in suitable bearings 311, 312 of the supporting legs 31 of the base of the machine. The short arm 313 of the bell crank lever is pivotally connected at one end to a connecting rod 314 provided with a forked portion 315 at its other end which slidably embraces the shaft 46, and is provided with a roller 316 which rides within a cam groove 317 of a cam carrying disc 318 mounted upon said shaft 46.

At the upper sides of the bracket members 304, 305 there are respectively provided horizontally disposed guide rods 319, 320 having their ends mounted in suitable upwardly extending supporting portions 321 of the members. Extending between and slidably supported upon these guide rods 319, 320 there is provided a transversely disposed paste applying and feeding member comprising a transverse bridging portion 322 and end portions 323, 324 having passages therethrough and in which are engaged the guide rods 319, 320. To each of the end portions of said wrapper feeding members there is pivotally connected at 325 a connecting rod 326, the other end of which is pivotally connected to the upper end of the bell crank member 327 pivotally mounted at 328 at the side of the base of the machine, and provided at the end of its short arm with a roller 329 which rides in a cam groove 330 of a cam disc 331 secured upon the shaft 46. It will be seen that the bell crank lever 313 is adapted to impart vertical reciprocatory movement to the bracket members 304, 305 to raise and lower the wrapper feeding member and that the bell crank member 327 is adapted to impart horizontal reciprocatory movement to said member. The path of movement of said member is indicated by the diagram in Fig. 22. The arm 128, previously described, for intermittently oscillating the feed roller 110 for the pouch lining paper A is secured to the bell crank lever 327 at one side to receive movement therefrom.

The feeding member first moves upwardly from contact with the wrapper stack to move the uppermost wrapper forwardly with relation to the form 79 where it is engaged by suitable folding mechanism, presently to be described, then moves forwardly to a point above the paste supplying mechanism, also presently to be described, downwardly into relation with said mechanism, inwardly to a point again above the stack and again downwardly into relation with the stack to engage the next wrapper to be fed.

At the underside of the wrapper feeding member there are secured a plurality of paste applying portions 332 adapted to apply paste at suitable points upon the uppermost wrapper of the stack and through the adhesive action of said paste to lift said wrapper into relation with the form 79. The parts of the wrapper which receive paste are indicated in Fig. 33 and include strip portions extending along the side edges of the wrapper at one side of the center, spot portions disposed at a plurality of points along the center line of the wrapper, and spot portions disposed at two spaced points along each edge of the wrapper at the other side of the center.

Between the brackets 304, 305 and forwardly of the stack container guide 270 there is secured upon the table portion 30 of the base a bracket 333 having integrally formed at its upper portion a horizontally disposed hollow heating chamber 334 having inlet and outlet connections 335, 336 for the admission and emission of a suitable heating medium, as steam, and upon the upper side of said heating chamber there is removably mounted a paste containing reservoir 337 provided at its underside with a dove-tailed rib 338 slidably engaged in a dove-tailed groove 339 formed in the upper side of said chamber to permit of the reservoir being readily removable for the purpose of cleaning. At the inner end of said reservoir there is journaled a shaft 340 upon which there are mounted paste rollers 341, and upon the outer end of said shaft there is provided a gear 342 meshing with a gear 343 journaled upon a stud shaft 344 supported at one side of the chamber 334, said stud shaft being further provided with a sprocket gear 345 over which an endless sprocket chain 346 extends from a sprocket gear 347 secured upon the shaft 310, which is driven from the rear drive shaft 41 by a sprocket chain 348 extending over gears 349, 350 on said respective shafts. Through this train of gearing the paste applying rollers 341 are continuously rotated. A hand wheel 351 is provided at the end of the shaft by means of which the entire mechanism of the machine may be manually operated when desired.

As the wrapper feeding member moves rearwardly along its lower traverse the paste supplying portions 332 contact with the surface of the rollers 341 so that paste is applied thereto. The feeding device then moves downwardly into engagement with the uppermost wrapper upon the stack and simultaneously with this engagement and during which there is a short dwell of the member, the releasing mechanism for the table 274 and the plunger 275 is operated by the cam projection 297 to momentarily permit the table to move upwardly under the force of the weight 283, so that a pressure impulse is applied between the wrapper and the paste containing points 332 of the feeding member to insure adhesion of the wrapper. After such impulse the table 274 is immediately locked by the plug 284 against further upward movement and thereupon the feeding member moves upwardly carrying with it the wrapper to a point directly beneath the form 79.

At this point folding mechanism, for folding the wrapper into pouch form about the pouch lining, is moved into relation with the form.

Upon the base 30 of the frame there is formed a tubular standard or support 352 in which there is slidably engaged for vertical reciprocation, a plunger rod 353 upon the upper end of which there is secured a horizontally disposed support 354 provided at its upper side with a horizontal slideway 355 in which a slide 356 is mounted for horizontal movement. The lower end of the plunger rod 353 is pivotally connected to a bell crank lever 357 loosely mounted upon the shaft 310 and having its short arm pivotally connected to one end of a connecting rod 358, the other end of which is forked, as at 359, and slidably embraces the shaft 46, a roller 360 being provided on this forked portion which rides in a cam groove 361 of a cam disc 362 mounted on the shaft 46.

The horizontal slide 356 is pivotally connected by a link 363 to the upper end of a lever 364 pivotally mounted at 365 upon a bracket 366 and provided at its lower end with a roller 367 which rides in a cam groove 368 of a cam disc 369 mounted on the shaft 46. The action of the bell crank 357 and the lever 364 is to impart vertical and horizontal reciprocatory movements to the slide member 356.

At the forward portion of the slide member 356 there is mounted upon vertically movable plungers 370 a vertically depressible platform 371 normally maintained in its raised position by means of a spring 372 coiled about a plunger 373 secured to the underside of said platform, and extending thru a passage 374 in the slide, said plunger being provided at its lower end with an enlargement 375 adapted to limit the upward movement of the platform.

As the wrapper feeding device completes its upward movement and brings the wrapper into relation with the end of the form, the horizontal slide 356 is moved forwardly into relation beneath the form, so that the platform 371 is in position to be raised into holding relation with the wrapper against the end of the form. Thereupon the vertically movable support 354 is raised and engages the platform 371 with the wrapper against the form. The wrapper feed member is provided centrally with a cut-out 376 opening rearwardly and which embraces the form and is adapted to permit forward movement of the member out of relation to the form.

At this point the wrapper feeding member has a further upward movement which serves to actuate stripping means to insure removal of the wrapper from the paste containing points. This stripping means comprises plates 377 disposed at the underside of said member near its ends and respectively provided with vertical plungers 378, 379 extending upwardly through the base of said member and connected at their upper ends to an arm 380, coil springs 381 being provided about these plungers between the arm 380 and the upper side of the member and which normally press the stripper plates into engagement with the underside of said device so that the paste applying portions 332 project free. The ends of the arms 380 project rearwardly of the member and have integrally formed levers 382 bent therefrom and pivotally mounted upon brackets 383 secured in each end of the member, said levers being adapted as the member reaches its uppermost position to be engaged by stationary pins 384 mounted upon the super-structure 34 and depressed thereby, whereby the stripper plates are depressed beneath the surface of the paste applying portions 332 to insure disengagement of the wrapper therefrom. Simultaneously with such disengagement, the platform 378 which has moved into relation with the form, grips the wrapper, and the wrapper feeding member thereupon moves forwardly out of relation with the form.

At the respective forward and rearward ends of the platform 371 folding fingers 385 are pivotally mounted at 386 upon the horizontal slide 356, each being provided with side flanges 387. Each finger is further provided with a projection 388 adapted to be engaged by a cam portion 389 provided upon each of the plungers 370 as the horizontal slide is moved upwardly relatively to the platform 371, which latter is held stationary against the end of the form. The fingers are thereby moved inwardly against the vertical ends of the form and the wrapper is thus folded inwardly at this point about the end of the form to form gusset folds.

Figure 13:
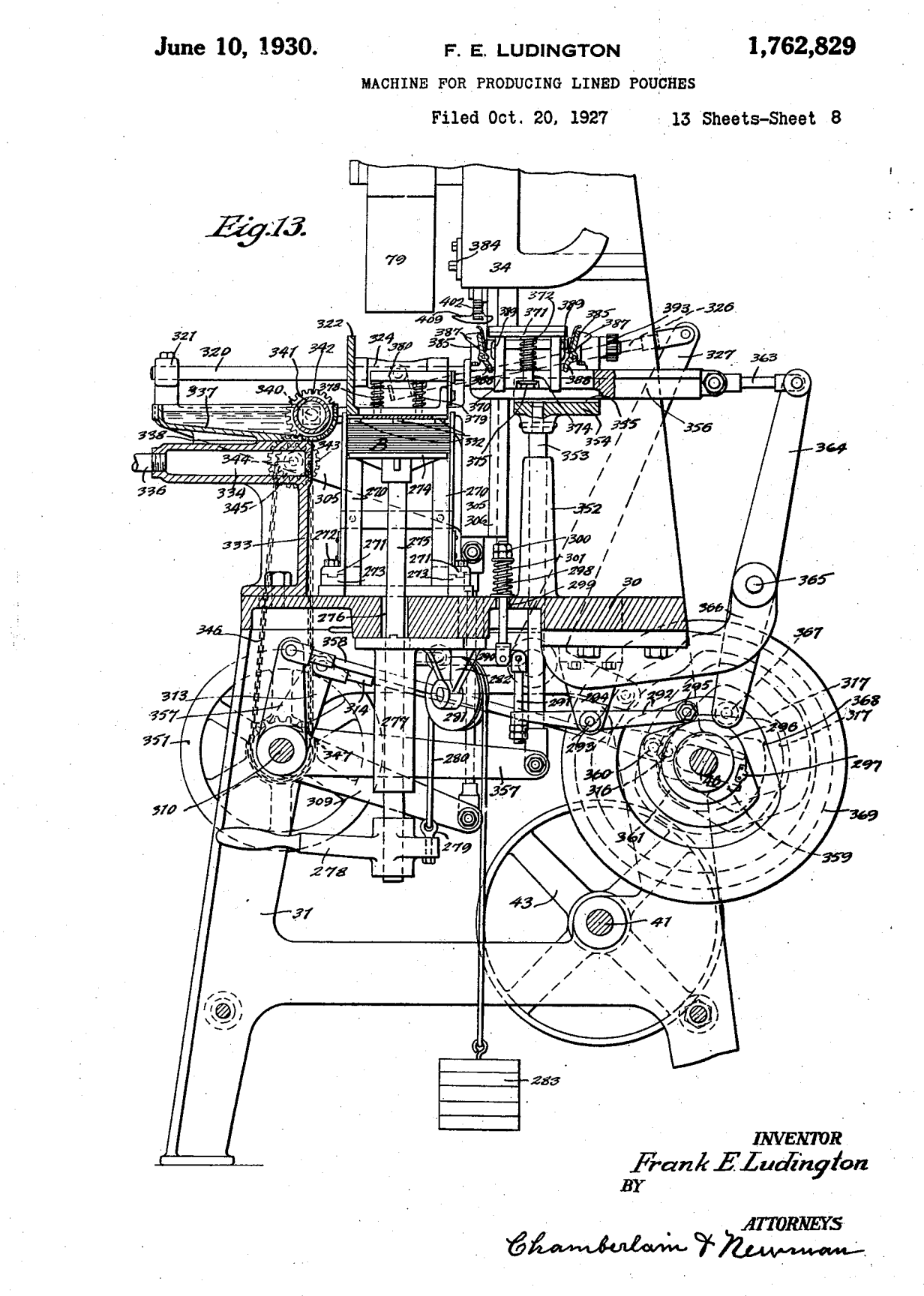
Figure 16:
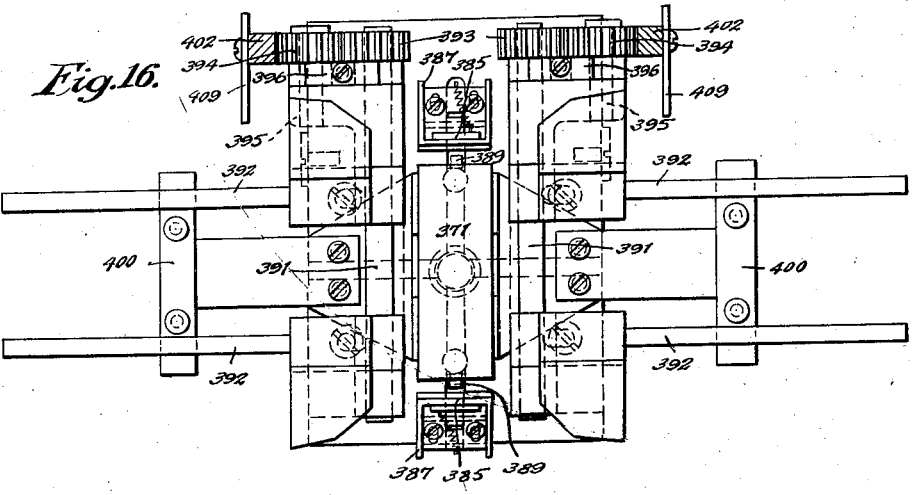
Fig. 16 is a plan view of the mechanism as shown in Fig. 4.
Figure 17:
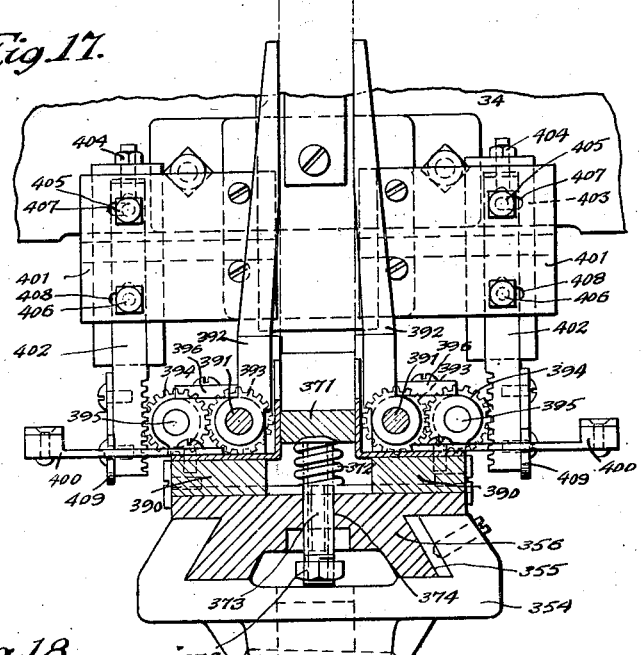
Fig. 17 is an enlarged vertical sectional view of the folding mechanism showing the same in the folding relation, as shown in Fig. 14.
Figure 18:
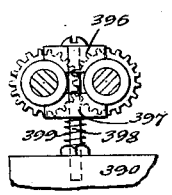
Fig. 18 is a detail view of a friction bearing employed in connection with the folding mechanism.

At each side of the platform 371 there is provided a bearing bracket 390 in which a horizontally disposed shaft 391 is pivotally mounted and has secured thereon a pair of folding arms 392. The shaft 391 is projected beyond the bearing bracket 390 and is provided with a gear 393 which meshes with another gear 394 provided upon a short arm 395 also journaled in the bearing bracket. As shown in Figs. 16 and 18, the shafts 391 and 395 are engaged by friction blocks 396, 397 disposed upon an upright post 398 upon which a coil spring 399 is provided and bears against the lower block 397. In the normal or non-folding position of the arms 392, they rest upon an extension support 400 secured to the bracket 390. A bracket 401 is secured to the super-structure 34 and at each side of the same there is adjustably mounted a vertical rack 402, this rack being adjustable vertically in its guide support 403 by means of a set screw 404 and being adjustable horizontally by means of set screws 405, 406 engaged through slots 407, 408 provided in the bracket 401. These racks are stationary and are disposed in intermeshing line with the pinion gears 394, so that as the horizontal slide 356 moves forwardly from the position as indicated in Fig. 13 to a position beneath the form 79, the pinion gears 394 are directly in line with the racks 402 so that as the slide 356 is moved upwardly through the upward movement of the plunger 353 the pinions engage the racks and thereby cause the folding arms 392 to swing upwardly into engagement with the vertical sides of the form to fold the sides of the wrapper about the same, as indicated in Fig. 34, this operation being substantially simultaneous with the operation of the folding fingers 385 which form the gusset folds. When so folded the pasted spots upon the wrapper adhere to the lining portion of the pouch and thereby maintain the folded relation of the sides of the wrapper until the folding operations upon the same are completed.

The folding mechanism now moves out of relation with the form, first moving downwardly so that the pinion gears 394 are disengaged from the racks 402, whereby the folding arms drop to their position as shown in Fig. 15 against the supports 400, the friction upon the shafts produced by the friction blocks 396, 397 preventing the arms from springing back after their engagement with the supports 400 so that during the rearward movement of the horizontal slide 356 these arms will be out of the path of the rack members. If for any reason, however, the arms are not in their lowermost position as the horizontal slide is moved rearwardly, forwardly projecting cam pieces 409 are secured upon the outer sides of the racks 402 and will force the arms downwardly beneath the racks, so that there is no possibility of the arms being broken through direct engagement with the racks during their rearward movement.

As the folding mechanism is moved out of relation with the form as just pointed out, the adhesion of the pouch wrapper to the pouch lining is sufficient to maintain its position temporarily, and thereupon the holding arms 217 at each side of the form are adapted to be moved to closed position to hold the pouch elements thereon during indexing of the carrier to the next station.

For this purpose a slide member 410 (Figs. 9, 10 and 12) is mounted for vertical movement in a slideway 411 provided upon the superstructure 34 and is provided at its upper end with a horizontal opening 412 engaged about a cam 413 provided upon the shaft 57, said member being normally drawn downwardly into engagement with said cam by means of coil springs 414, 415 connected at each side thereof and to suitable hooks 416 secured to the sides of the slideway. Upon the forward side of said slide there is secured an upwardly extending member 417 adapted as the slide moves upwardly to engage the pins 222 provided upon the levers 221 to impart initial closing movement to the arms 217, the closing of said arms being completed through the action of the spring 220, as heretofore pointed out.

The carrier is now indexed to move the form upon which the pouch lining and the partially folded wrapper are carried to the next station where the folding of the wrapper is completed and the completed pouch is stripped from the form.

Upon the bracket 38 there is secured a bearing plate 418 having a slideway 419 extending longitudinally of the bracket and in the plane of the form supporting the folded pouch, and in which slideway stripping mechanism hereinafter to be described is adapted to move. Above and below said slideway the plate 418 is provided with tubular bearing bosses 420, 421 in which are journaled shafts 422, 423 provided at their respective forward ends with arms 424, while at their rearward ends there are respectively provided pinions 425, 426, the rearward ends of said shafts being journaled in the bearing fixture 427 secured to the rearward side of the bracket 38.

A vertical slideway 428 is provided in the fixture 427 in which two vertically reciprocating racks 429, 430 are slidably mounted and retained by means of cover plate 431, the teeth of one rack being disposed at one side and meshing with the pinion 425 while the teeth of the other rack are disposed at the other side and mesh with the pinion 426. At the lower ends of the racks there are respectively provided rollers 432, 433 which ride upon cams 434, 435 secured upon the end of the continuously rotated shaft 51, being retained in engagement with said cams by means of springs 436, 437 tied between the upper ends of the racks in suitable anchor pins secured in the cover plate 431. The cams are so designed that the upper shaft 422 is oscillated in advance of the lower shaft 423, so that the upper arm 424 moves into relation with the form in advance of the lower arm 424.

Upon each of the arms 424 there is mounted a folding device for folding in the side flaps of the wrapper from the position shown in Fig. 34 to the position shown in Fig. 35. The folding device upon the upper arm 424 consists of two vertically disposed fixed folding plates or blades 438 adapted as the arm 424 is swung downwardly to engage at each side of the form, folding in the upper flaps which contain paste spots at their ends which serve to retain the same until the lower flaps are pasted in superposed relation upon them, the upper arm 424 moving the folding plates 438 out of relation to the form as the lower folding device moves into relation to fold in the lower flaps and paste them to the folded upper flaps. The lower folding device consists of a pair of forwardly projecting spaced rods 439 secured upon the arm 424, these rods being spaced and connected at their outer ends by means of a V-shaped brace bar 440. Adjacent each end of the rods 439 levers 441 are pivotally supported, these levers having relatively long arms extending downwardly and relatively short arms extending outwardly in substantially horizontal relation, and upon the short arms there are secured the folding plates 442. The lower ends of the forward lever arms 441 are connected by toggle links 443, 444 and the lower ends of the rearward lever arms 441 are connected by toggle links 445, 446, the two pairs of toggle links being pivotally connected to the ends of a center bar 447. The center bar is pivotally connected at its center by a link 448 to the outer end of a lever arm 449 secured within a recess 450 provided in the arm 424 upon a transverse rock shaft 451, and upon one end of this rock shaft there is secured a forwardly projecting lever arm 452 provided at its end with a roller 453. A spring 454 is connected between the lower ends of the forward lever arms 441 to normally retain the folding plates in their outwardly moved or open position, as indicated in Fig. 27, this position being adjustably determined by means of set screws 455 provided upon the forward lever arms 441 and engaging stops 456 provided upon the transverse bar 440. As above pointed out, the lower arm 424 moves into relation with the lower side of the form as the upper folding arm 424 moves out of relation, the folding plates 442 being in the open position as indicated in Fig. 27, and thereupon means is operated to engage the roller 453 of the arm 452 which action raises the center bar 447 through the actuation of the lever arm 449 thereby expanding the toggle links and bringing the folding plates 442 inwardly against the sides of the form, folding the lower flaps of the wrapper and securely pasting the same upon the previously folded upper flaps. Before the disengaging movement of the arm 424 the folding plates 442 are moved outwardly from engagement with the folded wrapper so that there is no tendency to withdraw or otherwise derange the folded flaps as the arm 442 moves out of relation with the form. The means for actuating the lever arm 452 consists of a cam extension 457 provided upon a bell crank lever 458 provided upon a shaft 459 pivotally mounted in a bearing 460 of the super-structure 34, the upper arm of the bell crank lever being disposed at the forward side of said structure while the lower arm is disposed at the rearward side. The lower arm is slotted as at 461 and has adjustably and pivotally connected thereto the upper end of a connecting rod 462, said rod being eccentrically connected at 463 to the outer side of the cam disc 331 secured upon the end of the countershaft 46. The connecting rod 462 is longitudinally adjustable by means of a turn buckle 464. It will thus be seen that the oscillation of the bell crank lever will cause the cam extension 457 to move beneath the lower folding device as the latter is in relation to the form, engaging the roller end 453 of the arm 452, thereby moving the folding plates 442 inwardly. The bell crank lever 458 also functions to actuate the stripping mechanism hereinafter to be described.

The completed pouch is now ready to be removed from the form by means of the stripping mechanism presently to be described, but prior to the stripping and just after the folding devices have moved out of relation with the form, the holding arms 217 which have been engaged at each side of the form during the last folding operation are adapted to be moved to open position. For this purpose a lever 465 is pivoted upon the superstructure 34 and has pivotally connected to it one end of a link 466, said link being forked at its other end and embracing the collar 232 of the shaft 57. A roller 467 is provided upon said forked end which rides upon a cam 468 formed upon the cam 232 and adapted to reciprocate the link to and fro, so that in proper timed relation the lever 465 is operated to engage a lug 469 formed upon its end with the pins 222 of the arms 217, moving the latter in opening direction to a point where the spring 220 completes such opening movement. A spring 470 connects the arm 465 to the arm 229 and serves the dual purpose of retaining the cam rollers for actuating these respective arms in engaging relation with the cams 236 and 468.

The stripping mechanism consists of a re-reciprocating slide 471 mounted for sliding movement in the slideway 419 and pivotally connected by a link 472 to the end of a lever 473 pivotally mounted upon the bracket 38 at 474 and connected by a link 475 to the bell crank lever 458, previously referred to.

The slide 471 is provided with a laterally projecting arm 476 having a tubular hub portion 477 formed therein and at each side of which there is pivotally mounted at 478 an arm 479 having a stripper finger 480 secured at its forward end and provided at its rearward end with a projecting portion 481 having a set screw 482 therein which contacts with a slide rod 483, the set screws of the two arms being held in engagement with said rod by means of a spring 484 tied between the portions 481 of said arms.

The slide rod is provided at its forward end with an enlarged portion 485 slidably engaged in the tubular hub portion 477, a bevelled neck portion 486 adjacent said portion 485, and a reduced portion 487 adjacent said neck portion, the other end of said rod having sliding bearing in the tubular bearing end 488 of a bracket arm 489 secured at the upper side of the slideway 419.

Spaced and adjustable stop nuts 490, 491 are provided upon the rod for abutment with the bearing portion 488 in the respective forward and rearward positions of the stripper. Fig 25 indicates the normal retracted and open position of the stripping device in which the slide rod has been moved forwardly relatively to the sliding arm 476 by engagement, during the rearward movement, of the nut 490 with the bearing 488, so that the set screws 482 engage the reduced portion 487 of the slide rod 483 to open the stripper arms.

As the slide is reciprocated forwardly to bring the arms about the forward side of the form this open position is maintained until the stop nut 491 engages the bearing 488, whereupon the slide continues its forward movement relatively to the slide rod, and the arms are closed through the wedging action of the bevelled neck portion 486 between the set screws, as shown in Fig. 24, the stripper finger ends 480 being engaged with the sides of the form adjacent the end of the pouch. The slide is now reciprocated rearwardly, and during this rearward movement the closed position of the arms is maintained until the nut 490 again engages the bearing 488, and the pouch is thus stripped from the form.

As the pouch is stripped from the end of the form, it falls on an inclined chute 492 secured to the bracket 38, and is carried by this chute to a conveyor or suitable receptacle.

I have illustrated and described a preferred and satisfactory embodiment of the invention, but it will be obvious that changes may be made therein, within the spirit and scope thereof, as defined in the appended clams.

Having thus described my invention, what I claim and desire to secure by Letters Patent is:

1. In a pouch forming machine, a mandrel form, means for feeding a strip of material into relation with said form, folding means for folding said material about said form and including a rocker shaft, a holding arm mounted upon said shaft and having rotary movement thereon, side folding arms mounted on said shaft, a yieldable connection between said side folding arms and said holding arm comprising a pressure arm fixed to said shaft, a plunger carried by said holding arm engaged through said pressure arm, a limit stop on said plunger, and a spring disposed on said plunger between said arms, said rocker shaft being adapted to move said holding and folding arms into relation with said form whereby said material is held upon said form and folded at the sides, and other folding means adapted to complete the folding of the material about the form.

2. In a pouch forming machine, a mandrel form, means for feeding a strip of material into relation with said form, folding means for folding the material about said form and including a rocker shaft, a holding arm and side folding arms mounted on said shaft and adapted to be moved by said shaft into relation with said form whereby said material is held upon said form and folded at the sides, a rocker lever at one end of said shaft, a reciprocating slide, a link connecting said rocker lever to said slide, and cam means adapted to reciprocate said slide whereby said rocker lever is oscillated, and other folding means adapted to complete the folding of the material about the form.

3. In a pouch forming machine, a mandrel form, means for feeding a strip of material into relation with said form, folding means for folding said material about said form and including rocker shafts disposed at each side of said form, arms respectively mounted on said shafts, rocker levers secured to said respective shafts, an operating lever, cam means for oscillating said lever, and links connecting said rocker shafts and adapted to be oscillated in opposite directions to swing said arms toward and away from each other, folding means carried by said arms adapted to engage the form to fold the sides of the material at each side inwardly upon said form, and other folding means adapted to complete the folding of the material into pouch form.

4. In a pouch forming machine, a mandrel form, means for feeding a strip of material into relation with said form, means adapted to apply paste to a side edge of said material, means for folding the sides of said material about the form with said pasted side edge overlying the other side edge, a holding and pressure applying member, means for moving said member into engagement with said form to hold and press said overlying edges, auxiliary pressure applying means adapted to co-operate with said holding and pressure applying member to impart increased pressure thereto, and other folding means adapted to complete the folding of the material into pouch form.

5. In a pouch forming machine, a movable mandrel form adapted to be indexed, means for feeding a strip of material into relation with said form, means adapted to apply paste to a side edge of said material, means for folding the sides of said material about the form with said pasted side edge overlying the other side edge, a holding and pressure applying member, means provided in relation to one stationary position of said form for moving said member into engagement with said form to hold and press said overlying edges, cam means provided between said stationary position and the successive stationary position of said form adapted to cooperate with said holding and pressure applying member to impart increased pressure thereto during the indexing movement of said form, and other folding means adapted to complete the folding of the material into pouch form.

6. In a pouch forming machine, a movable mandrel form adapted to be indexed, means for feeding a strip of material into relation with said form, means adapted to apply paste to a side edge of said material, means for folding the sides of said material about the form with said pasted side edge overlying the other side edge, a holding and pressure applying member, means provided in relation to one stationary position of said form for moving said member into engagement with said form to hold and press said overlying edges, resiliently mounted auxiliary pressure applying means adapted to co-operate with said holding and pressure applying member in said stationary position of the form and during its initial indexing movement to impart increased pressure thereto, cam means provided between said stationary position and the successive stationary position of said form adapted to co-operate with said holding and pressure applying member to impart increased pressure thereto during the further indexing movement of said form, and other folding means adapted to complete the folding of the material into pouch form.

7. In a pouch forming machine, a movable mandrel form adapted to be indexed, means for feeding a strip of material into relation with said form, means adapted to apply paste to a side edge of said material, means for folding the sides of said material about the form with said pasted side edge overlying the other side edge, a pivotally mounted holding and pressure applying member, means provided in relation to one stationary position of said form for moving said member into engagement with said form to hold and press said overlying edge, a pressure lever arm fixed to the pivotal axis of said member, cam means provided between said stationary position and the successive stationary position of said form adapted to engage said pressure arm to impart increased pressure to said member during the indexing movement of said form, and other folding means adapted to complete the folding of the material into pouch form.

8. In a pouch forming machine a rotatable form carrier adapted to be intermittently indexed and including a mandrel form disposed in constant radial relation to the axis of said form carrier, feeding means, for feeding a strip of material into relation with said form in the stationary position thereof, folding means adapted to fold the sides of said material about said form, other folding means adapted to fold the sides and an end of said material about the form and leaving an end flap unfolded, means adapted during the indexing movement of the carrier to fold said end flap, and a resilient roller disposed in relation to said last means adapted to apply pressure to said end flap during said indexing movement.

9. In a pouch forming machine, a mandrel form, means for feeding a sheet of material into relation with the end of said form, retaining and folding means for said sheet comprising a vertically movable support and a horizontally movable slide member carried thereby, means for imparting horizontal movement to said slide member to bring it into relation beneath said form, means for imparting vertical movement to said support to bring said member into engagement with said form, retaining means on said member having relative vertical movement, side folding arms pivotally mounted on said member, pinions for said arms, and stationary racks adapted to be engaged with said pinions during said relative vertical movement, whereby the sheet is folded upwardly about the sides of the form, and other folding means adapted to complete the folding of the sheet into pouch form.

10. In a pouch forming machine, a mandrel form, means for feeding a sheet of material into relation with the end of said form, retaining and folding means for said sheet comprising a vertically movable support and a horizontally movable slide member carried thereby, means imparting horizontal movement to said slide member to bring it into relation beneath said form, means for imparting vertical movement to said support to bring said member into engagement with said form, retaining means on said member having relative vertical movement, side folding arms pivotally mounted on said member adapted to be moved from a substantially horizontal to a vertical position, friction means for yieldably retaining said arms in their moved positions, means actuated of said relative vertical movement for moving said folding arms to their vertical position whereby the sheet is folded upwardly about the sides of the form, and other folding means adapted to complete the folding of the sheet into the pouch form.

11. In a pouch forming machine, a mandrel form, means for feeding a sheet of material into relation with the end of said form, retaining and folding means for said sheet comprising a vertically movable support and a horizontally movable slide member carried thereby, means for imparting horizontal movement to said slide member to bring it into relation beneath said form, means for imparting vertical movement to said support to bring said member into engagement with said form, retaining means on said member having relative vertical movement, side folding arms pivotally mounted on said member, pinions for said arms, and stationary racks adapted to be engaged with said pinions during said relative vertical movement whereby the sheet is folded upwardly about the sides of the form and cam means adapted to move said folding arms out of the path of said racks during the return horizontal movement of said horizontally movable slide member.

12. In a pouch forming machine, a rotatable carrier adapted to be intermittently indexed and including a mandrel form, means provided at one position of said form for feeding a sheet of material into relation with the end of said form, means for folding the ends of said material about said form, and folding means provided at another position of said form for completing the folding and comprising upper and lower side engaging members, one of said members having movable side portions adapted to fold the sheet at one side about said form, and cam means co-operating with said movable sides adapted to be actuated to apply pressure thereto.

13. In a pouch forming machine, a rotatable carrier adapted to be intermittently indexed and including a mandrel form, means provided at one position of said form for feeding a sheet of material into relation with the end of said form, means for folding the ends of said material about said form, and folding means provided at another position of said form for completing the folding and comprising upper and lower side engaging members, one of said members having fixed sides adapted to fold the sheet at one side about said form, and the other of said members having movable side portions adapted to fold the sheet at the other side about said form in superimposed relation to said first folds and means co-operating with said movable sides adapted to apply pressure thereto.

Signed at Waterbury, in the county of New Haven and State of Connecticut this 18th day of October, A. D. 1927.

FRANK E. LUDINGTON.